United States Patent
Wu

(10) Patent No.: US 10,215,994 B2
(45) Date of Patent: Feb. 26, 2019

(54) DISPLAY PANEL, METHOD OF MANUFACTURING DISPLAY PANEL, AND DISPLAY APPARATUS

(71) Applicant: BOE Technology Group Co., Ltd., Beijing (CN)

(72) Inventor: Kun Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 37 days.

(21) Appl. No.: 14/435,565

(22) PCT Filed: Aug. 29, 2014

(86) PCT No.: PCT/CN2014/085513
§ 371 (c)(1),
(2) Date: Apr. 14, 2015

(87) PCT Pub. No.: WO2015/154368
PCT Pub. Date: Oct. 15, 2015

(65) Prior Publication Data
US 2016/0259172 A1     Sep. 8, 2016

(30) Foreign Application Priority Data

Apr. 9, 2014   (CN) .......................... 2014 1 0141615

(51) Int. Cl.
*G02B 27/22*     (2018.01)
*G02B 27/26*     (2006.01)
(Continued)

(52) U.S. Cl.
CPC ......... *G02B 27/2214* (2013.01); *G02B 27/26* (2013.01); *G02F 1/133514* (2013.01);
(Continued)

(58) Field of Classification Search
CPC ......... G02F 1/133526; G02F 1/133528; G02F 2001/133562; G02B 27/2214;
(Continued)

(56) References Cited

U.S. PATENT DOCUMENTS 8,446,535 B2 * 5/2013 Miyazaki ............ B32B 37/1018
349/15
8,860,894 B2   10/2014 Kim et al.
(Continued)

FOREIGN PATENT DOCUMENTS

CN       101344698 A    1/2009
CN       102116991 A    7/2011
(Continued)

OTHER PUBLICATIONS

International Search Report and Written Opinion for PCT Application No. PCT/CN2014/085513, dated Dec. 31, 2014, 11 pages, English portions only.
(Continued)

*Primary Examiner* — Angela K Davison
(74) *Attorney, Agent, or Firm* — Westman, Champlin & Koehler, P.A.

(57) ABSTRACT

A display panel, a method of manufacturing the display panel, and a display apparatus are provided in the embodiments of the present invention. The display panel comprises a first substrate assembly and a second substrate assembly, and a first polarizing filter and a second polarizing filter. The first substrate assembly and the first polarizing filter are located on a light output side. A lens grating is disposed between the first polarizing filter and the first substrate assembly of the display panel, and a substrate of the first substrate assembly serves as a substrate of the lens grating.

5 Claims, 5 Drawing Sheets

(51) Int. Cl.
*G02F 1/1335* (2006.01)
*G02F 1/1343* (2006.01)

(52) U.S. Cl.
CPC .. *G02F 1/133528* (2013.01); *G02F 1/134309* (2013.01); *G02F 1/133526* (2013.01); *G02F 2001/133562* (2013.01)

(58) Field of Classification Search
CPC .. G02B 27/26; G02B 27/225; H04N 13/0402; H04N 13/0404; H04N 13/0406
USPC .............. 349/15, 74, 57, 95, 200, 77, 83; 359/462; 348/42, 51, 59; 345/4, 6
See application file for complete search history.

(56) References Cited

U.S. PATENT DOCUMENTS

| | | | | |
|---|---|---|---|---|
| 2007/0195409 A1* | 8/2007 | Yun | ............... | G02B 27/2214 359/462 |
| 2011/0249093 A1* | 10/2011 | Yeh | ............... | G02B 5/201 348/46 |
| 2012/0075434 A1* | 3/2012 | Kim | ............... | H04N 13/305 348/51 |
| 2012/0293503 A1* | 11/2012 | Miyazawa | ......... | G02B 27/2214 345/419 |
| 2013/0107174 A1* | 5/2013 | Yun | ............... | G02F 1/133526 349/96 |

FOREIGN PATENT DOCUMENTS

| | | |
|---|---|---|
| CN | 102243402 A | 11/2011 |
| CN | 102436101 A | 5/2012 |
| CN | 102629041 A | 8/2012 |
| CN | 102854628 A | 1/2013 |
| CN | 103941469 A | 7/2014 |
| KR | 10-2009-0003023 A | 1/2009 |

OTHER PUBLICATIONS

Second Office Action, including Search Report, for Chinese Patent Application No. 201410141615.6, dated Aug. 9, 2016, 16 pages.
First Office Action, including Search Report, for Chinese Patent Application No. 201410141615.6, dated Feb. 2, 2016, 16 pages.
English translation of Box No. V of the Written Opinion for the International Searching Authority of International Application No. PCT/CN2014/085513, 3 pages.
Office Action for Chinese Patent Application No. 201410141615.6, dated Dec. 29, 2016.
Fourth Office Action from Chinese Patent Application No. 201410141615.6, dated Jun. 9, 2017, 12 pages.
Rejection Decision for Chinese Patent Application No. 201410141615.6, dated Nov. 27, 2017, 17 pages.

* cited by examiner

DISPLAY PANEL, METHOD OF MANUFACTURING DISPLAY PANEL, AND DISPLAY APPARATUS

CROSS-REFERENCE TO RELATED APPLICATION

This Application is a Section 371 National Stage Application of International Application No. PCT/CN2014/085513, filed Aug. 29, 2014, which has not yet published, which claims priority to Chinese Application No. 201410141615.6, filed Apr. 9, 2014, in Chinese, the contents of which are hereby incorporated by reference in their entirety.

BACKGROUND OF THE INVENTION

1. Field of the Invention

Embodiments of the present invention relate to the field of display manufacture, and particularly to a display panel, a method of manufacturing the display panel, and a display apparatus.

2. Description of the Related Art

With the quick development of stereoscopic displaying technique, there is an increasingly high demand for stereoscopic displaying apparatuses. Among many techniques for achieving three-dimensional stereoscopic displaying, a naked-eye stereoscopic displaying technique is favored in the field of three-dimensional stereoscopic displaying due to its advantage that a viewer don't need to use spectacles.

At present, a main manner for achieving the naked-eye stereoscopic displaying technique is as follows: pixel units of a display panel are divided into odd-numbered columns of pixels and even-numbered columns of pixels in a horizontal direction by disposing a grating in front of the display panel, to provide left and right eyes of a viewer with two different pictures, respectively, and form a depth of field by parallax effect of the pictures for the left and right eyes of the viewer, so as to generate an stereoscopic displaying effect. Existing grating techniques include those using black and right parallax barrier gratings, a cylindrical physical lens, and the like. Since a grating pitch of an ordinary grating is non-adjustable, this limits a viewer to view only within a certain distance range. The adaptability and viewing distance are limited. This restricts application of a grating type stereoscopic displaying technique in daily life. To this end, a liquid crystal barrier grating and liquid crystal lens technique in which a grating pitch of the liquid crystal barrier grating can be adjusted by a voltage has been developed in the industry.

In a liquid crystal lens type stereoscopic display apparatus in the prior art, the liquid crystal lens structure and a display device are separated from each other and bonded through an adhesive layer to form the stereoscopic display apparatus. In this structure, a liquid crystal layer of the liquid crystal lens is spaced from a color filter (CF) of the display device by a lower glass substrate of the liquid crystal lens, the adhesive layer, an upper polarizing filter of the display device, and a color filter glass substrate of the display device, so that a placement height from the color filter of the display device to the liquid crystal lens is increased. A requirement for viewing display contents at a short distance cannot be satisfied.

SUMMARY OF THE INVENTION

In accordance with embodiments of the present invention, there is provided a display panel, a method of manufacturing the display panel, and a display apparatus, by which a distance between a lens grating and a color filter layer of the display panel can be decreased.

In accordance with an aspect of the embodiments of the present invention, there is provided a display panel comprising: a first substrate assembly and a first polarizing filter which are located on a light output side of the display panel; and a lens grating disposed between a light output side of the first substrate assembly and the first polarizing filter.

Optionally, the display panel is embodied as a liquid crystal display panel, and the display panel further comprises: a second substrate assembly opposed to and spaced from the first substrate assembly, wherein the second substrate assembly is located on a light input side of the display panel, and a panel liquid crystal layer is disposed between the first substrate assembly and the second substrate assembly; and a third substrate assembly located on the light output side of the first substrate assembly and disposed on a light input side of the first polarizing filter, wherein the lens grating is embodied as a liquid crystal lens grating, and the lens grating comprises: a first electrode disposed on a light input side of the third substrate assembly; a second electrode disposed on the light output side of the first substrate assembly; a lens liquid crystal layer disposed between the light output side of the first substrate assembly and the light input side of the third substrate assembly, wherein an electric field between the first electrode and the second electrode is adapted to deflect a liquid crystal in the lens liquid crystal layer.

Optionally, a substrate of the first substrate assembly serves as a substrate of the lens grating.

Optionally, the first electrode is a patterned electrode. Furthermore, the first electrode is a strip-shaped electrode.

In accordance with another aspect of the embodiments of the present invention, there is provided a display panel comprising: a first substrate assembly and a first polarizing filter which are located on a light output side of the display panel, wherein a color filter layer is disposed on a light input side of the first substrate assembly; and a lens grating disposed between a light output side of the first substrate assembly and the first polarizing filter, wherein a distance between the color filter layer and the lens grating in a thickness direction of the display panel is among 0.1-0.25 mm. Optionally, the lens grating is a liquid crystal lens grating. Optionally, a substrate of the first substrate assembly serves as a substrate of the lens grating.

In accordance with a further aspect of the embodiments of the present invention, there is provided a display panel comprising: a first substrate assembly disposed on a light output side of the display panel, wherein the first substrate assembly has a color filter layer coated on a light input side thereof, the first substrate assembly has a lens grating provided on a light output side thereof, and a substrate of the first substrate assembly serves as a substrate of the lens grating. Optionally, the lens grating is a liquid crystal lens grating.

In accordance with a still another aspect of the embodiments of the present invention, there is provided a method of manufacturing a display panel comprising steps of: providing a first substrate assembly and a first polarizing filter which are located on a light output side of the display panel; and disposing a lens grating between a light output side of the first substrate assembly and the first polarizing filter. Optionally, the display panel is embodied as a liquid crystal display panel, and the liquid crystal display panel comprises: a second substrate assembly located on a light input side of the display panel, wherein a panel liquid crystal layer is formed between the first substrate assembly and the second substrate assembly, wherein the step of disposing the lens grating between the light output side of the first substrate assembly and the first polarizing filter comprises steps of providing a third substrate assembly opposed to the light output side of the first substrate assembly; forming a first electrode on a light input side of the third substrate assembly; disposing a second electrode on the light output side of the first substrate assembly; assembling the first substrate assembly and the third substrate assembly together and filling a lens liquid crystal therebetween, and wherein an electric field between the first electrode and the second electrode is adapted to deflect the lens liquid crystal in the lens liquid crystal layer. Furthermore, the step of forming the first electrode comprises etching the first electrode into a first patterned electrode.

In accordance with a still further aspect of the embodiments of the present invention, there is provided a method of manufacturing a display panel comprising steps of: providing a first substrate assembly located on a light output side of the display panel, coating a light input side of the first substrate assembly with a color filter layer; and disposing a lens grating on a light output side of the first substrate assembly, wherein a substrate of the first substrate assembly serves as a substrate of the lens grating.

The embodiments of the present invention also relates to a display device comprising the above-mentioned display panel.

With the display panel, the method of manufacturing the display panel, and the display apparatus according to the embodiments of the present invention, the distance between the lens grating and the color filter layer of the display panel can be directly decreased, thereby providing a possibility of satisfying the requirement for viewing display contents at a short distance.

BRIEF DESCRIPTION OF THE DRAWINGS

In order to describe embodiments of the present invention or technical solutions in the prior art more clearly, accompanying drawings required for describing the embodiments or the prior art will be simply explained as below. Apparently, the accompanying drawings for the following description are only some embodiments of the present invention. Those skilled in the art also could derive other accompanying drawings from these accompanying drawings without making a creative work.

DETAILED DESCRIPTION OF THE EMBODIMENTS

A clear and complete description of the technical solutions in the embodiments will be made as below with reference to embodiments of the present invention taken in conjunction with the accompanying drawings. Apparently, the described embodiments are some of the embodiments of the present invention rather than all of the embodiments of the present invention. All other embodiments derived by those skilled in the art based on the embodiments of the present invention without making a creative work shall fall within the protection scope of the present invention.

Figure 1:
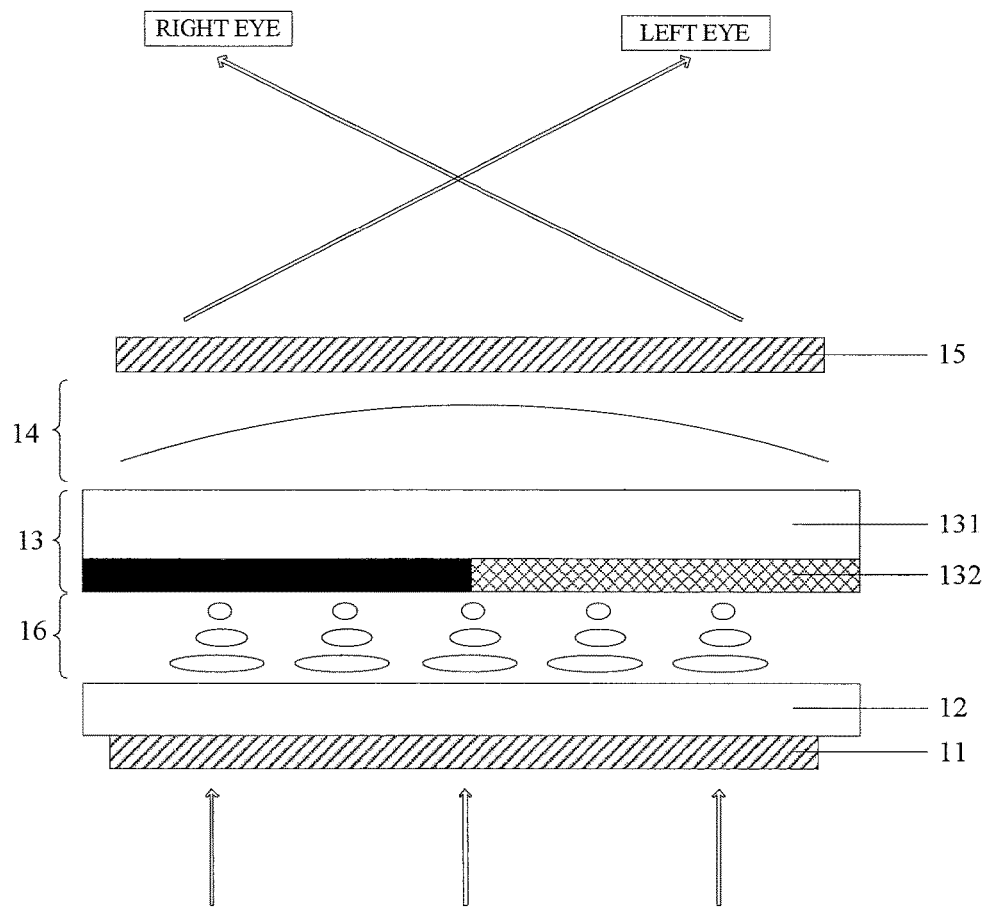
FIG. 1 is a schematic diagram showing a configuration of a display panel according to an embodiment of the present invention.

In accordance with an embodiment of the present invention, there is provided a display panel as shown in FIG. 1. The display panel is composed of a second polarizing filter 11, a second substrate assembly 12, a first substrate assembly 13, a lens grating 14, and a first polarizing filter 15. The first substrate assembly 13 is located on a light output side of the display panel, the second substrate assembly 12 is located on a light input side of the display panel, the first polarizing filter 15 is located on a light output side of the first substrate assembly 13, the second polarizing filter 11 is located on a light input side of the second substrate assembly 12, and the lens grating 14 is disposed between the first polarizing filter 15 and the first substrate assembly 13. The first substrate assembly 13 comprises a substrate 131 and a color filter layer 132. The lens grating 14 shares the substrate 131 of the first substrate assembly 13 with the display panel.

The color filter layer 132 is composed of a color filter and a black matrix. When the display panel is embodied as a liquid crystal display panel, the display panel further comprises a display panel liquid crystal layer 16 between the first substrate assembly 13 and the second substrate assembly 12.

In the display panel according to the embodiments of the present invention, the lens grating is disposed between the first polarizing filter and the first substrate assembly of the display panel, and the lens grating shares the substrate of the first substrate assembly with the display apparatus. Therefore, a distance between the lens grating and a display unit (more specifically, the color filter layer 31, referring to for example FIG. 3) of the display panel can be directly decreased, thereby satisfying the requirement for viewing display contents at a short distance.

Figure 2:
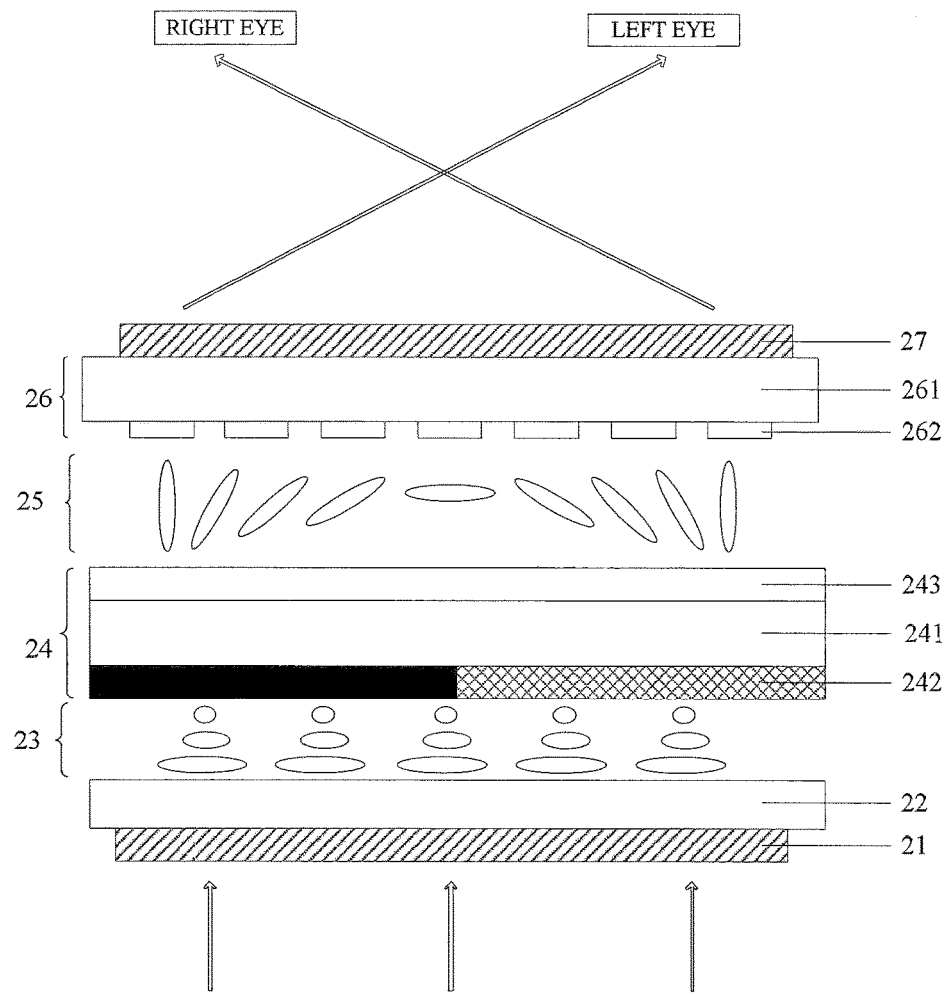
FIG. 2 is a schematic diagram showing a configuration of a display panel according to another embodiment of the present invention.

Specifically, a display panel of a liquid crystal display and a liquid crystal lens serving as the lens grating are taken as an example. As shown in FIG. 2, the display panel comprises a second polarizing filter 21, a second substrate assembly 22, a display panel liquid crystal layer 23, a first substrate assembly 24, a lens liquid crystal layer 25, a third substrate assembly 26 and a first polarizing filter 27. The first substrate assembly 24 of the display panel shares a substrate 241 of the first substrate assembly 24 with the lens grating. The lens grating comprises the first substrate assembly 24 and the third substrate assembly 26. Liquid crystal is filled in between the first substrate assembly 24 and the third substrate assembly 26 to form a lens liquid crystal layer 25. The first substrate assembly 24 comprises the substrate 241 and a color filter layer 242. The first polarizing filter 27 is disposed on a light output side of the third substrate assembly 26. The third substrate assembly 26 comprises a lens substrate 261 disposed on a light input side of the first polarizing filter 27 and a first electrode 262 disposed on the lens substrate 261. The first substrate assembly 24 further comprises a second electrode 243 disposed on a light output side of the substrate 241 of the first substrate assembly 24. The first electrode 262 and the second electrode 243 may be etched into patterned electrodes according to actual requirements. Optionally, the first electrode 262 may be etched into a strip-shaped electrode or a checkerboard-shaped electrode. An electric field between the first electrode 262 and the second electrode 243 controls deflection of the liquid crystal of the lens liquid crystal layer 25 of the lens grating to form a liquid crystal grating.

Figure 3:
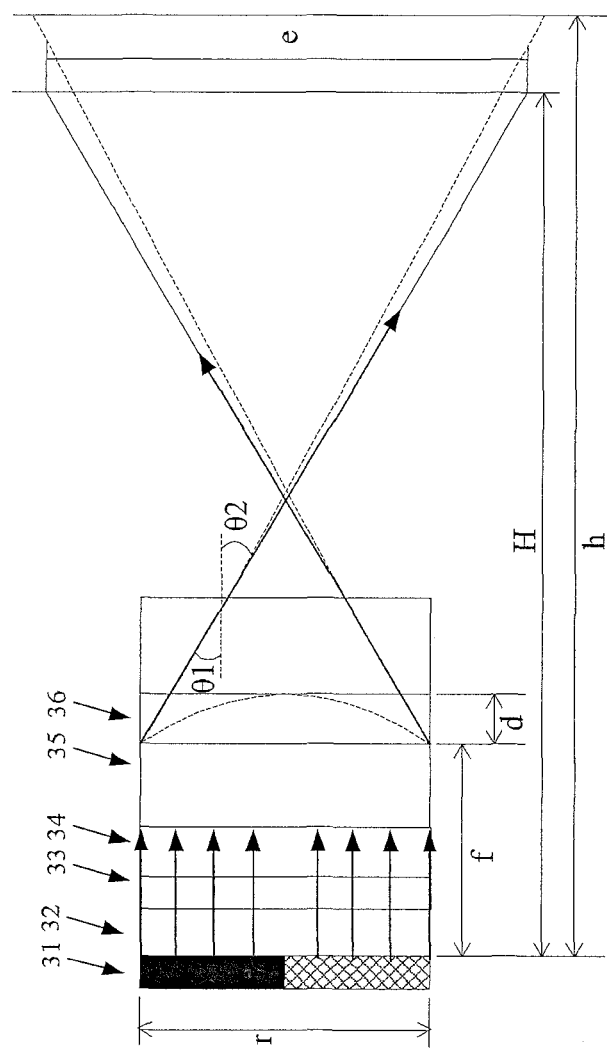
FIG. 3 is a schematic diagram showing a design principle of a light path of a display panel.

Referring to FIG. 3, according to a design principle of a liquid crystal lens type stereoscopic display apparatus in the prior art, it can be known that the display apparatus comprises a lower glass substrate 35 of the liquid crystal lens, an adhesive layer 34, an upper polarizing filter 33 of a display device and a color filter glass substrate 32 of the display device which are located between the color filter layer 31 and the lens liquid crystal layer 36 of the liquid crystal lens. A focal length f of the liquid crystal lens 36 is much less than a viewing distance H.

A formula of $$H = \frac{f \cdot e \cdot \cos\theta_2}{1.5 \cdot r \cdot \cos\theta_1}$$

can be derived from the following three formulas:

$$\frac{h}{e} = \frac{f}{r},$$

$$h = \frac{e}{2} tg\left(\frac{\pi}{2} - \theta_1\right), \text{ and}$$

$$H = \frac{e}{2} tg\left(\frac{\pi}{2} - \theta_2\right).$$

Since it is required to satisfy requirements that stereoscopic display contents for naked eyes is adapted to be viewed at a short distance, it is necessary to reduce the actual viewing distance H between human eyes and the display device. According to the derived formula, the requirements can be satisfied by reducing the focal length f and thus increasing a viewing angle if an interpupillary distance e and a sub-pixel width r are unchanged. In the above formulas, h denotes a viewing distance without consideration of an index of refraction of 1.5 of the glass relative to the air, H denotes the actual viewing distance, e denotes the interpupillary distance, f denotes the focal length of the liquid crystal lens (i.e., a placement distance between the color filter of the display panel and the lens liquid crystal layer of the liquid crystal lens), r denotes the sub-pixel width, $\theta_1$ denotes an incident angle, and $\theta_2$ denotes an emergence angle.

When the interpupillary distance e of human eyes is 65 mm and the display panel is embodied as a display screen of a mobile telephone, its sub-pixel width r is in a range of 21-40 μm and its viewing distance H for stereoscopic displaying is 300-400 mm. Therefore, an actually required focal length f is in a range of 0.1-0.25 mm. However, in the prior art, the focal length f is in a range of 0.35-2.8, which cannot satisfy the condition that stereoscopic display contents are viewed by naked eyes on the mobile telephone at a short distance.

With the display panel according to the above-mentioned embodiments of the present invention, the adhesive layer 34 and the first polarizing filter 33 between the color filter layer 31 and the lens liquid crystal layer 36 of the liquid crystal lens can be eliminated, and especially if the liquid crystal lens and the display panel share a single substrate, the placement distance between the color filter of the display panel and the lens liquid crystal layer of the liquid crystal lens can be controlled within the range of 0.1-0.25 mm. This satisfies the requirements that stereoscopic display contents for naked eyes are viewed at a short distance.

It should be specially pointed out that the above-mentioned lens grating is not limited to the liquid crystal lens grating, and it may also be a physical lens grating having a gradient refractive index profile.

In the present invention, the lens grating is disposed between the first polarizing filter and the light output side of the first substrate assembly. As a result, at least the distance between the color filter layer and the lens grating can be reduced. For example, at least a thickness of the first polarizing filter can be decreased. If the condition that the placement distance between the color filter of the display panel and the lens liquid crystal layer of the liquid crystal lens is controlled within the range of 0.1-0.25 mm is satisfied, the lens grating may also be provided with its own glass substrate adhering to the substrate of the first substrate assembly. However, in the embodiment as shown in FIG. 2, the substrate 241 of the first substrate assembly 24 serves as the substrate of the lens grating so as to further eliminate the glass substrate of the lens grating itself and the adhesive layer for bonding the glass substrate to the first substrate assembly, thereby further decreasing the placement distance between the color filter of the display panel and the lens liquid crystal layer of the liquid crystal lens.

In conclusion, the embodiments of the present invention are provided such that the placement distance between the color filter of the display panel and the lens liquid crystal layer of the liquid crystal lens is decreased. Accordingly, the present invention also provides the following technical solution. A display panel comprises: a first substrate assembly and a first polarizing filter which are located on a light output side of the display panel, wherein the first substrate assembly has a color filter layer disposed on a light input side thereof; and a lens grating disposed between a light output side of the first substrate assembly and the first polarizing filter, wherein a distance between the color filter layer and the lens grating in a thickness direction of the display panel is among 0.1-0.25 mm. The present invention also provides the following technical solution. A display panel comprises: a first substrate assembly disposed on a light output side of the display panel, wherein the first substrate assembly has a color filter layer coated on a light input side thereof, and a lens grating provided on a light output side thereof, and a substrate of the first substrate assembly serves as a substrate of the lens grating.

In the display panel according to the embodiments of the present invention, the lens grating is disposed between the first polarizing filter and the first substrate assembly of the display panel, or further, the substrate of the first substrate assembly serves as the substrate of the lens grating. Therefore, a distance between the lens grating and a display unit of the display panel can be directly decreased, thereby providing a possibility of satisfying the requirement for viewing display contents at a short distance.

A method of manufacturing a display panel, by which the distance between the lens grating and the color filter layer can be decreased, will be described as below.

Figure 4:
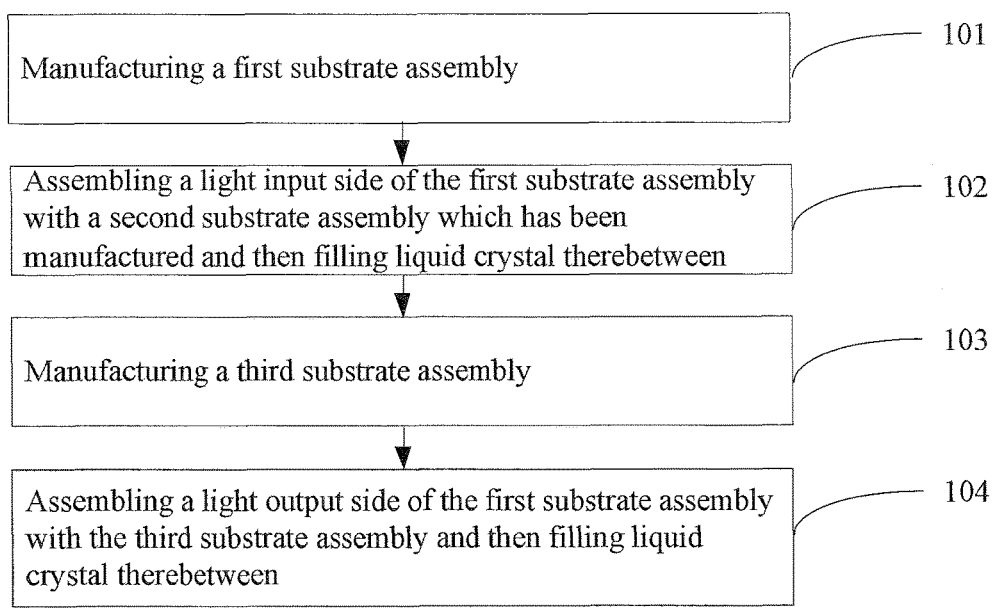
FIG. 4 is a schematic flow diagram of a method of manufacturing a display panel, according to an embodiment of the present invention.

According to embodiments of the present invention, there is provided a method of manufacturing a display panel. As shown in FIG. 4, a specific manufacturing process is presented as follow:

at step 101, a first substrate assembly is manufactured;

at step 102, a light input side of the first substrate assembly is assembled with a second substrate assembly which has been manufactured, and liquid crystal is filled in between the light input side of the first substrate assembly and the second substrate assembly to form a panel liquid crystal layer;

at step 103, a third substrate assembly is manufactured; and at step 104, a light output side of the first substrate assembly is assembled to the third substrate assembly, and liquid crystal is filled in between the light output side of the first substrate assembly and the third substrate assembly to form a lens grating, and a substrate of the first substrate assembly serves as a substrate of the lens grating.

With the method of manufacturing a display panel according to the embodiments of the present invention, the lens grating is disposed between the first polarizing filter and the first substrate assembly of the display panel, and the lens grating shares the substrate of the first substrate assembly with the display apparatus. Therefore, a distance between the lens grating and a display unit of the display panel can be directly decreased, thereby satisfying the requirement for viewing display contents at a short distance.

Figure 5:
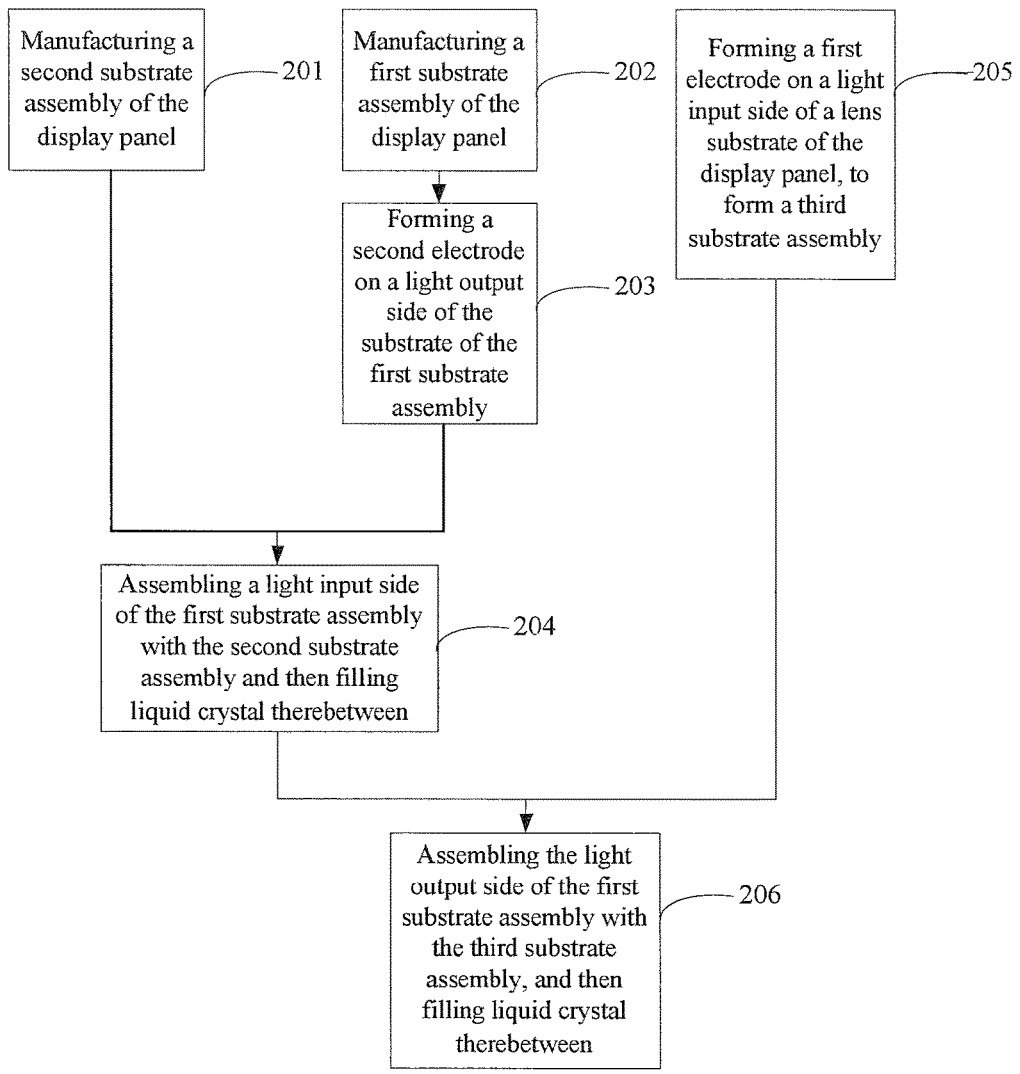
FIG. 5 is a schematic flow diagram of a method of manufacturing a display panel, according to another embodiment of the present invention.

Referring to FIG. 5, a method of manufacturing a display panel according to an embodiment of the present invention comprises the following process.

At step 201, a second substrate assembly of the display panel is manufactured.

The second substrate assembly may be an array substrate. According to requirements for a product, data lines and gate lines crossing over each other are formed while forming thin film transistor devices on a substrate of the second substrate assembly by a patterning process in the prior art. If the display panel is embodied as a liquid crystal display panel, it also comprises structures such as an orientation layer, and pixel electrodes.

At step 202, a first substrate assembly of the display panel is manufactured.

The manufacturing of the first substrate assembly specifically comprises forming a color filter layer on a substrate of the first substrate assembly by a patterning process in the prior art. If the display panel is embodied as a liquid crystal display panel, it also comprises structures such as another orientation layer, and a common electrode.

At step 203, a second electrode is formed on a light output side of the substrate of the first substrate assembly.

Specifically, the first substrate assembly of the display panel is turned over, a layer of transparent electrically-conductive material is deposited by a chemical vapor deposition (Plasma Enhanced Chemical Vapor Deposition (PECVD)), and a second electrode layer is formed by a patterning process. According to actual requirements, the second electrode layer may be formed in any pattern such as a strip shape pattern or a checkerboard shape pattern. The transparent electrically-conductive material may be an ITO material or a graphene. In addition, the substrate of the display panel is manufactured according to actual requirements for a product. When manufacturing the substrate, a thickness of the substrate should be maintained in a range of 0.1-1.0 mm. If the thickness of the substrate exceeds this range, the substrate may be thinned in advance so that its thickness meets the requirements.

At step 204, a light input side of the first substrate assembly is assembled to the second substrate assembly, and liquid crystal is filled in between the light input side of the first substrate assembly and the second substrate assembly.

At step 205, a first electrode is formed on a light input side of a lens substrate of the display panel to form a third substrate assembly.

A layer of transparent electrically-conductive material is deposited by a chemical vapor deposition (Plasma Enhanced Chemical Vapor Deposition (PECVD)), and a first electrode layer is formed by a patterning process. According to actual requirements, the first electrode layer may be formed in any pattern such as a strip shape pattern or a checkerboard shape pattern. The transparent electrically-conductive material may be an ITO material or a graphene. In addition, when manufacturing the lens substrate, in order to increase a mechanical strength of the entire display panel of the liquid crystal display, a thickness of the lens substrate may be made a bit thicker, and a thickness range of the lens substrate is maintained within a range of 0.3-1.0 mm.

At step 206, a light output side of the first substrate assembly is assembled to the third substrate assembly, and liquid crystal is filled in between the light output side of the first substrate assembly and the third substrate assembly.

The method further comprises attaching a second polarizing filter on a light input side of the second substrate assembly and attaching a first polarizing filter on a light output side of the lens first substrate assembly after step 206.

With the method of manufacturing a display panel of a liquid crystal display according to the embodiments of the present invention, the lens grating is disposed between the first polarizing filter and the first substrate assembly of the display panel, and the lens grating shares the substrate of the first substrate assembly with the display apparatus. Therefore, a distance between the lens grating and a display unit of the display panel can be directly decreased, thereby satisfying the requirement for viewing display contents at a short distance.

The above manufacturing methods are only illustrative. The method of manufacturing a display panel according to embodiments of the present invention comprises other methods of disposing the lens grating between the light output side of the first substrate assembly and the first polarizing filter so as to decrease the distance between the color filter layer and the lens grating.

For example, according to embodiments of the present invention, there is provided a method of manufacturing a display panel. The method comprises steps of: providing a first substrate assembly and a first polarizing filter which are located on a light output side of the display panel; and disposing a lens grating between a light output side of the first substrate assembly and the first polarizing filter. If the display panel is embodied as a liquid crystal display panel, the liquid crystal display panel comprises: a second substrate assembly located on a light input side of the display panel. A panel liquid crystal layer is formed between the first substrate assembly and the second substrate assembly. Accordingly, the step of disposing the lens grating between the light output side of the first substrate assembly and the first polarizing filter comprises steps of providing a third substrate assembly opposed to the light output side of the first substrate assembly; forming a first electrode on a light input side of the third substrate assembly; disposing a second electrode on the light output side of the first substrate assembly; assembling the first substrate assembly with the third substrate assembly and then filling a lens liquid crystal in between the first substrate assembly and the third substrate assembly. An electric field between the first electrode and the second electrode is adapted to deflect the lens liquid crystal in the lens liquid crystal layer.

In addition, for example, according to embodiments of the present invention, there is provided a method of manufacturing a display panel. The method comprises steps of: providing a first substrate assembly that is located on a light output side of the display panel, coating a light input side of the first substrate assembly with a color filter layer; and disposing a lens grating on a light output side of the first substrate assembly, wherein a substrate of the first substrate assembly serves as a substrate of the lens grating.

According to embodiments of the present invention, there provides a display apparatus comprising any of the above-mentioned display panels. The display apparatus may comprise display devices such as an electronic paper, a mobile telephone, a TV, a digital frame, and the like. The display apparatus according to embodiments of the present invention is suitable especially for display products configured for viewing contents at a short distance and operated on a palm, such as a mobile telephone and an IPAD.

The above contents are only the specific embodiments of the present invention. However, the protection scope of the present invention is not limited thereto. Changes or substitutions that can be easily conceived by any person skilled in the art within the technical scope disclosed in the present invention should be contained within the protection scope of the present invention. Therefore, the protection scope of the present invention should be defined by the protection scope of the claims.

The invention claimed is:

1. A stereoscopic display panel comprising:
   a display panel comprising: a first substrate assembly located on a light output side of the display panel and comprising:
   a single-layer substrate having a first surface on a light input side of the first substrate assembly and a second surface located on a light output side of the first substrate assembly and opposite to the first surface; and
   a color filter layer disposed on and in contact with the first surface of the substrate of the first substrate assembly;
   a second substrate assembly opposed to and spaced from the first substrate assembly;
   a panel liquid crystal layer disposed between the first substrate assembly and the second substrate assembly; and
   a first polarizing filter which is located on the light output side of the first substrate assembly; and
   a lens grating disposed between the light output side of the first substrate assembly and the first polarizing filter such that light from the panel liquid crystal layer enters the lens grating through no polarizing filter, wherein:
   the lens grating is embodied as a liquid crystal lens grating, and the lens grating comprises:
   a third substrate assembly located on the light output side of the first substrate assembly and disposed on a light input side of the first polarizing filter;
   a first electrode disposed on a light input side of the third substrate assembly;
   a second electrode disposed on and in contact with the second surface of the substrate of the first substrate assembly; and
   a lens liquid crystal layer disposed between the light output side of the first substrate assembly and the light input side of the third substrate assembly, wherein an electric field between the first electrode and the second electrode is adapted to deflect liquid crystals in the lens liquid crystal layer.

2. The stereoscopic display panel of claim 1, wherein: the first electrode is embodied as a patterned electrode.

3. The stereoscopic display panel of claim 2, wherein: the first electrode is embodied as a strip-shaped electrode.

4. The stereoscopic display panel of claim 1, wherein: a distance between the color filter layer and the lens grating in a thickness direction of the display panel is between 0.1-0.25 mm.

5. A display apparatus comprising: the stereoscopic display panel of claim 1.

* * * * *